(12) United States Patent
Fukunaga

(10) Patent No.: US 7,166,268 B2
(45) Date of Patent: Jan. 23, 2007

(54) CATALYST FOR HYDROCARBON REFORMING AND METHOD OF REFORMING HYDROCARBON WITH THE SAME

(75) Inventor: Tetsuya Fukunaga, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 151 days.

(21) Appl. No.: 10/415,558

(22) PCT Filed: Nov. 5, 2001

(86) PCT No.: PCT/JP01/09660

§ 371 (c)(1),
(2), (4) Date: May 1, 2003

(87) PCT Pub. No.: WO02/38268

PCT Pub. Date: May 16, 2002

(65) Prior Publication Data

US 2004/0014600 A1    Jan. 22, 2004

(30) Foreign Application Priority Data

Nov. 8, 2000  (JP) ............................. 2000-339897

(51) Int. Cl.
*C01B 3/26* (2006.01)
(52) U.S. Cl. ...................... 423/651; 423/652; 502/304; 502/326; 502/327; 502/328; 502/332; 502/337; 502/339; 502/344
(58) Field of Classification Search ............... 502/304, 502/326, 328, 327, 332, 337, 339, 344; 423/651, 423/652
See application file for complete search history.

(56) References Cited

U.S. PATENT DOCUMENTS

| 3,929,965 A | * | 12/1975 | Kim et al. ................ 423/213.5 |
| 4,134,860 A | * | 1/1979 | Hindin et al. ................ 502/327 |
| 4,206,087 A | * | 6/1980 | Keith et al. .................. 502/304 |
| 4,294,726 A | * | 10/1981 | Bozon et al. ................ 502/304 |
| 5,008,090 A | * | 4/1991 | Joy et al. .................... 423/212 |
| 5,286,699 A | * | 2/1994 | Ohata et al. ................ 502/304 |
| 2002/0028853 A1 | * | 3/2002 | Manzer et al. .............. 518/713 |
| 2003/0103892 A1 | * | 6/2003 | Niu et al. ................... 423/651 |
| 2004/0102315 A1 | * | 5/2004 | Bailie et al. ................ 502/304 |

FOREIGN PATENT DOCUMENTS

| DE | 44 27 665 | * | 2/1996 |
| EP | 1 048 347 | | 11/2000 |
| JP | 5-200294 | * | 8/1993 |
| JP | 5-270802 | * | 10/1993 |
| WO | WO 00/10704 | | 3/2000 |

OTHER PUBLICATIONS

Database WPI, AN 1986-090619, XP-002307263, JP 61-035853, Feb. 20, 1986.
Database WPI, AN 1989-064230, XP-002307264, JP 01-015138, Jan. 19, 1989.
Jens R. Rostrup-Nielson, Activity of Nickel Catalysts for Steam Reforming of Hydrocarbons, Journal of Catalysts, 31, pp. 173-199, (1973).

* cited by examiner

*Primary Examiner*—David Sample
(74) *Attorney, Agent, or Firm*—Oblon, Spivak, McClelland, Maier & Neustadt, P.C.

(57) ABSTRACT

The present invention provides a catalyst suitably employed in a variety of hydrocarbon reforming processes and a hydrocarbon reforming process including employing the catalyst in production of hydrogen or synthesis gas. The hydrocarbon reforming catalyst of the present invention contains an alumina carrier containing cerium oxide and, carried on the carrier, component (a), component (b), and optional component (c), the component (a) being at least one platinum group element selected from among ruthenium, platinum, rhodium, palladium, and iridium; the component (b) being cobalt and/or nickel, the component (c) being an alkaline earth metal. When steam reforming, autothermal reforming, partial-oxidation reforming, or carbon dioxide reforming of hydrocarbons is performed through employment of the catalyst, hydrogen or synthesis gas can be produced.

20 Claims, No Drawings

CATALYST FOR HYDROCARBON REFORMING AND METHOD OF REFORMING HYDROCARBON WITH THE SAME

TECHNICAL FIELD

The present invention relates to a hydrocarbon reforming catalyst and a hydrocarbon reforming process employing the catalyst. More particularly, the invention relates to a catalyst suitable for reforming processes for hydrocarbons, the catalyst comprising an alumina carrier containing cerium oxide and, as an active component, a specific platinum group element carried by the alumina carrier, and to a process for steam reforming, autothermal reforming, partial-oxidation reforming, or carbon dioxide reforming of hydrocarbons through employment of the catalyst.

BACKGROUND ART

In recent years, new energy-production techniques have attracted attention from the standpoint of environmental issues, and among these techniques a fuel cell has attracted particular interest. The fuel cell converts chemical energy to electric energy through electrochemical reaction of hydrogen and oxygen, attaining high energy utilization efficiency. Therefore, practical studies have been carried out on realization of fuel cells for public use, industrial use, automobile use, etc.

Fuel cells are categorized in accordance with the type of employed electrolyte, and, among types, a phosphoric acid type, a molten carbonate type, a solid oxide type, and a solid polymer electrolyte type have been known. With regard to hydrogen sources, studies have been conducted on methanol; liquefied natural gas predominantly containing methane; city gas predominantly containing natural gas; a synthetic liquid fuel produced from natural gas serving as a feedstock; and petroleum-derived hydrocarbons such as naphtha and kerosene.

When hydrogen is produced from petroleum-derived hydrocarbons, the hydrocarbons are generally steam-reformed in the presence of catalysts. Among such catalysts, catalysts that contain ruthenium carried by a carrier as an active component have conventionally been studied, in view of their advantages; e.g., comparatively high activity and suppression of carbon deposition even under low steam/carbon ratio operational conditions. In recent years, these ruthenium catalysts have been expected to use in fuel cells, which require a long-life catalyst.

Since a co-catalyst effect of cerium oxide exerted on a ruthenium catalyst was discovered, ruthenium-cerium oxide-based catalysts have been studied and some patent applications have been filed (Japanese Patent Publication (kokoku) No. 59-29633 and Japanese Patent Application Laid-Open (kokai) Nos. 60-147242, 4-281845, 9-10586, and 2000-61307).

In addition to ruthnium-based catalysts, catalysts predominantly containing platinum, rhodium, palladium, iridium, or nickel have been studied. However, these catalysts have drawbacks, in that catalytic activity in terms of steam reforming of hydrocarbons remains unsatisfactory, and that carbon is deposited in a large amount during reforming.

In addition to the aforementioned steam reforming, other reforming processes for producing hydrogen, such as autothermal reforming, partial-oxidation reforming, and carbon dioxide reforming have been studied. As is known, all the above reforming processes can generally be performed through employment of the same reforming catalyst, and synthesis gas can also be produced through all the above processes with slight modification of reforming conditions. Studies have also been carried out on use of platinum group elements such as ruthenium, platinum, rhodium, palladium, and iridium in catalysts for the above autothermal reforming, partial-oxidation reforming, and carbon dioxide reforming. However, catalytic activity of the catalyst employing the elements remains unsatisfactory.

DISCLOSURE OF THE INVENTION

In view of the foregoing, an object of the present invention is to provide a high-activity hydrocarbon reforming catalyst which contains a platinum group element as an active component and which is suitably adapted to a variety of hydrocarbon reforming processes. Another object of the present invention is to provide a process for effectively steam reforming, autothermal reforming, partial-oxidation reforming, or carbon dioxide reforming hydrocarbons through employment of the above-mentioned reforming catalyst.

The present inventors have carried out extensive studies in an effort to attain the aforementioned objects, and have found that the objects can be attained through employment of a catalyst comprising an alumina carrier containing cerium oxide; and, carried on the carrier, a specific platinum group element component; a cobalt or nickel component; and an optional alkaline earth metal component. The present invention has been accomplished on the basis of this finding.

Accordingly, the present invention provides the following:

(1) a hydrocarbon reforming catalyst comprising an alumina carrier containing cerium oxide and, carried on the carrier, component (a) and component (b), the component (a) being at least one platinum group element selected from among ruthenium, platinum, rhodium, palladium, and iridium, the component (b) being cobalt and/or nickel;

(2) a steam reforming process for hydrocarbons in production of hydrogen or synthesis gas, the process comprising employing the above-described hydrocarbon reforming catalyst;

(3) an autothermal reforming process for hydrocarbons in production of hydrogen or synthesis gas, the process comprising employing the above-described hydrocarbon reforming catalyst;

(4) a partial-oxidation reforming process for hydrocarbons in production of hydrogen or synthesis gas, the process comprising employing the above-described hydrocarbon reforming catalyst; and (5) a carbon dioxide reforming process for hydrocarbons in production of hydrogen or synthesis gas, the process comprising employing the above-described hydrocarbon reforming catalyst.

BEST MODE FOR CARRYING OUT THE INVENTION

Firstly, the hydrocarbon reforming catalyst of the present invention will be described.

In the reforming catalyst of the present invention, the carrier is formed from alumina containing cerium oxide. Any crystal type of alumina species; i.e., $\alpha$-, $\beta$-, $\gamma$-, $\eta$-, $\theta$-, $\kappa$-, and $\chi$-alumina (commercial products), can be used. In addition, calcined products of alumina hydrate such as boehmite, bayerite, or gibbsite can also be used. Other than the alumina species, there may also be used a calcined product obtained by adding an alkaline buffer solution of pH 8 to 10 to aluminum nitrate, to thereby precipitate aluminum hydroxide, and calcining the hydroxide, or a calcined product of aluminum chloride. A product prepared through a sol-gel method may also be used, the product being prepared by dissolving an alkoxide (e.g., aluminum isopropoxide) in an alcohol (e.g., 2-propanol); adding an inorganic acid (e.g., hydrochloric acid) as a hydrolysis catalyst, to thereby form alumina gel; and drying and calcining the gel.

With regard to cerium oxide, commercial cerium oxide may be used. Alternatively, cerium oxide prepared through a conventional process from a cerium compound such as cerium nitrate [$Ce(NO)_3 \cdot 6H_2O$], cerium chloride [$CeCl_3 \cdot 7H_2O$], or cerium carbonate [$Ce_2(CO_3)_3 \cdot 8H_2O$] can be used.

The alumina containing cerium oxide may be used as a mixture of cerium oxide and any of the aforementioned alumina species. However, a product prepared by impregnating alumina with an aqueous solution of any of the aforementioned cerium compound is more preferred.

The percent amount of cerium oxide and that of alumina are preferably 5 to 40 wt. % and 95 to 60 wt. %, respectively. When the amount of alumina is in excess of 95 wt. %, the effect of cerium oxide is poor in some cases, whereas when the amount of alumina is less than 60 wt. %, the surface area of the carrier or the mechanical strength of the catalyst often unfavorably decreases.

In the reforming catalyst of the present invention, at least one platinum group element selected from among ruthenium, platinum, rhodium, palladium, and iridium (component (a)); cobalt and/or nickel (component (b)); and an optional alkaline earth metal (component (c)) are carried on the thus-obtained alumina carrier containing cerium oxide. No particular limitation is imposed on the method of carrying these components, and the components may be carried sequentially or simultaneously. For example, there can be employed a method in which a solution containing component (a), a solution containing component (b), and a solution containing component (c) are prepared individually, and are sequentially brought into contact with a carrier; a method in which a solution containing components (a) and (b), a solution containing components (a) and (c), and a solution containing components (b) and (c) are prepared individually, and one of the solutions and a solution containing the corresponding balance component are sequentially brought into contact with a carrier; or a method in which a solution containing three components (a), (b), and (c) is prepared and the three components are simultaneously carried. Of these, simultaneous carrying of these components is preferred in view of economy.

Carrying operation of the above components may be performed through any of a variety of methods such as impregnation (e.g., heat impregnation, ambient temperature impregnation, vacuum impregnation, ambient pressure impregnation, impregnation and bringing into dryness, or pore filling); immersion; light permeation; wet adsorption; spraying; and applying. Of these, impregnation is preferred.

The conditions under which the carrying operation is performed are similar to those conventionally employed, and the operation is suitably performed under atmospheric pressure or reduced pressure. In this case, no particular limitation is imposed on the operation temperature, and room temperature or temperatures approximate to room temperature may be adapted. Alternatively, heating and temperature elevation can also be employed in accordance with needs. Specifically, carrying operation is suitably performed at room temperature to approximately 80° C. The contact time for carrying is approximately one minute to ten hours.

Examples of ruthenium compounds for providing component (a) include ruthenium salts such as $RuCl_3 \cdot nH_2O$, $Ru(NO_3)_3$, $Ru_2(OH)_2Cl_4 \cdot 7NH_3 \cdot 3H_2O$, $K_2(RuCl_5(H_2O))$, $(NH_4)_2(RuCl_5(H_2O))$, $K_2(RuCl_5(NO))$, $RuBr_3 \cdot nH_2O$, $Na_2RuO_4$, $Ru(NO)(NO_3)_3$, $(Ru_3O(OAc)_6(H_2O)_3)OAc \cdot nH_2O$, $K_4(Ru(CN)_6) \cdot nH_2O$, $K_2(Ru(NO)_2)_4(OH)(NO))$, $(Ru(NH_3)_6)Cl_3$, $(Ru(NH_3)_6)Br_3$, $(Ru(NH_3)_6)Cl_2$, $(Ru(NH_3)_6)Br_2$, $(Ru_3O_2(NH_3)_{14})Cl_6 \cdot H_2O$, $(Ru(NO)(NH_3)_5)Cl_3$, $(Ru(OH)(NO)(NH_3)_4)(NO_3)_2$, $RuCl_2(PPh_3)_3$, $RuCl_2(PPh_3)_4$, $RuClH(PPh_3)_3 \cdot C_7H_8$, $RuH_2(PPh_3)_4$, $RuClH(CO)(PPh_3)_3$, $RuH_2(CO)(PPh_3)_3$, $(RuCl_2(cod))_n$, $Ru(CO)_{12}$, $Ru(acac)_3$, $(Ru(HCOO)(CO)_2)_n$, and $Ru_2I_4(p\text{-cymene})_2$. Of these, $RuCl_3 \cdot nH_2O$, $Ru(NO_3)_3$, and $Ru_2(OH)_2Cl_4 \cdot 7NH_3 \cdot 3H_2O$ are preferably used from the viewpoint of material handling.

Examples of platinum compounds for providing component (a) include $PtCl_4$, $H_2PtCl_6$, $Pt(NH_3)_4Cl_2$, $(NH_4)_2PtCl_2$, $H_2PtBr_6$, $NH_4[Pt(C_2H_4)Cl_3]$, $Pt(NH_3)_4(OH)_2$, and $Pt(NH_3)_2(NO_2)_2$.

Examples of rhodium compounds for providing component (a) include $Na_3RhCl_6$, $(NH_4)_2RhCl_6$, $Rh(NH_3)_5Cl_3$, and $RhCl_3$.

Examples of palladium compounds for providing component (a) include $(NH_4)_2PdCl_6$, $(NH_4)_2PdCl_4$, $Pd(NH_3)_4Cl_2$, $PdCl_2$, and $Pd(NO_3)_2$.

Examples of iridium compounds for providing component (a) include $(NH_4)_2IrCl_6$, $IrCl_3$, and $H_2IrCl_6$.

These compounds may be used singly or in combination of two or more species.

Examples of nickel compounds for providing component (b) include $Ni(NO_3)_2$, $NiSO_4$, $NiCl_2$, $Ni(OH)_2$, and $Ni(CH_3COO)_2$. Examples of cobalt compounds for providing component (b) include $Co(NO_3)_2$, $Co(OH)_2$, $CoCl_2$, $CoSO_4$, $CO_2(SO_4)_3$, and $CoF_3$. These compounds may be used singly or in combination of two or more species.

Examples of alkaline earth metal compounds for providing optionally employed component (c) include Ba salts such as $BaBr_2$, $Ba(BrO_3)_2$, $BaCl_2$, $Ba(ClO_2)_2$, $Ba(ClO_3)_2$, $Ba(ClO_4)_2$, $BaI_2$, $Ba(N_3)_2$, $Ba(NO_2)_2$, $Ba(NO_3)_2$, $Ba(OH)_2$, $BaS$, $BaS_2O_6$, $BaS_4O_{and\ Ba(SO3}NH_2)_2)$; Ca salts such as $CaBr_2$, $CaI_2$, $CaCl_2$, $Ca(ClO_3)_2$, $Ca(IO_3)_2$, $Ca(NO_2)_2$, $Ca(NO_3)_2$, $CaSO_4$, $CaS_2O_3$, $CaS_2O_6$, $Ca(SO_3NH_2)_2$, $Ca(CH_3COO)_2$, and $Ca(H_2PO_4)_2$; Mg salts such as $MgBr_2$, $MgCO_3$, $MgCl_2$, $Mg(ClO_3)_2$, $MgI_2$, $Mg(IO_3)_2$, $Mg(NO_2)_2$, $Mg(NO_3)_2$, $MgSO_3$, $MgSO_4$, $MgS_2O_6$, $Mg(CH_3COO)_2$, $Mg(OH)_2$, and $Mg(ClO_4)_2$; and Sr salts such as $SrBr_2$, $SrCl_2$, $SrI_2$, $Sr(NO_3)_2$, $SrO$, $SrS_2O_3$, $SrS_2O_5$, $SrS_4O_6$, $Sr(CH_3COO)_2$, and $Sr(OH)_2$. These compounds may be used singly or in combination of two or more species. Among these compounds, magnesium salts are preferred from the viewpoint of enhancement of properties such as heat resistance.

Compounds which can be employed as sources for providing the aforementioned components (a), (b), and (c) are not limited to the above-listed compounds. In addition to such compounds having a solubility in a specific solvent, a variety of similar compounds can also be used so long as these compounds can satisfactorily be dissolved in a solvent through addition or in the co-presence of acid or an acidic compound. Thus, in order to enhance solubility of the compounds and adjust pH, an inorganic acid such as hydrochloric acid, sulfuric acid, or nitric acid, or an organic acid such as acetic acid or oxalic acid may be added to a solution of each compound for providing component (a), (b), or (c). The concentration of the solution of each compound for providing component (a), (b), or (c) may be appropriately determined in accordance with the amount of each catalyst component carried on the carrier.

The reforming catalyst of the present invention contains the platinum group element (i.e., component (a)) carried on the carrier preferably in a metal amount falling within a range of 0.1 to 8 wt. % based on the entire amount of the catalyst, more preferably 0.5 to 5 wt. %. When the amount is less than 0.1 wt. %, the catalytic activity is poor in some cases, whereas when the amount is in excess of 8 wt. %, the catalytic activity cannot be enhanced commensurate with the amount, which is not preferable in economy.

The metal amount of cobalt and/or nickel (i.e., component (b)) carried on the carrier preferably falls within a range of 0.1 to 20 wt. % based on the entire amount of the catalyst, more preferably 0.5 to 10 wt. %. When the amount is less than 0.1 wt. %, effect on enhancement of catalytic activity is not fully attained, whereas when the amount is in excess of 20 wt. %, the catalytic activity cannot be enhanced commensurate with the amount, which is not preferable in economy.

The metal amount of optionally added alkaline earth metal (i.e., component (c)) carried on the carrier preferably falls within a range of 1 to 20 wt. % based on the entire amount of the catalyst, more preferably 2 to 10 wt. %. When the amount is less than 1 wt. %, heat resistance of the catalyst is not fully enhanced in some cases, whereas when the amount is in excess of 20 wt. %, the catalytic activity or the heat resistance cannot be enhanced commensurate with the amount, and the catalytic activity rather decreases in some cases.

After completion of the carrying operation of the aforementioned components on the carrier, the carrier is dried. No particular limitation is imposed on the drying method, and any drying method such as natural drying or drying by use of a rotary evaporator or a blow dryer can be employed.

When the reforming catalyst is prepared, calcination is generally performed after drying. In this case, however, component (a) may be evaporated, oxidized, or aggregated during high-temperature calcination, thereby inducing a decrease in catalytic activity, and therefore, calcination is preferably avoided after completion of carrying component (a) serving as the active component of the catalyst.

When calcination is not performed, a decomposition step for decomposing the salts of the components carried on the carrier is preferably included. This step is included in order to prevent decomposition, inside the reactor, of the components in the form of chlorides, nitrates, etc. carried on the carrier and to suppress leakage of decomposition products from the reactor. The decomposition step may be performed through a method including heating in an oxygen-free atmosphere (nitrogen, hydrogen, etc.) or a method including conversion of the salt components on the carrier into the corresponding hydroxide through reaction with an aqueous alkali solution. Of these, a method employing an aqueous alkali solution can be performed in a simple manner. No particular limitation is imposed on the type of the aqueous alkali solution, and any aqueous alkali solutions can be employed so long as the solutions are alkaline. Examples of the solutions include aqueous ammonia solution and aqueous solutions of an alkali metal compound or an alkaline earth metal compound. Of these, alkali metal hydroxides such as potassium hydroxide and sodium hydroxide ate preferably employed. When such an aqueous alkali solution is used in the decomposition step, a high-concentration aqueous alkali solution is preferably used.

When calcination is performed, the calcination is carried out in air or under air flow for about 2 to about 6 hours, preferably about 2 to about 4 hours, typically at 400 to 800° C., preferably 450 to 800° C.

No particular limitation is imposed on the shape and size of the thus-prepared catalyst, and any shape and structure of generally used catalysts can be employed. Examples of the shape of the catalyst include powder, spheres, granules, honey-comb, foam, fiber, cloth, plates, and rings.

The thus-prepared catalyst is charged into a reactor and subjected to reduction by hydrogen prior to reforming reaction. Reduction by hydrogen is generally performed under hydrogen flow for about 1 to about 24 hours, preferably about 3 to about 12 hours, at 500 to 800° C., preferably 600 to 700° C.

The hydrocarbon reforming catalyst of the present invention is suitably employed as a catalyst for steam reforming, autothermal reforming, partial-oxidation reforming, or carbon dioxide reforming hydrocarbons.

Among reforming catalysts falling within the scope of the present invention, a catalyst containing ruthenium as the platinum group element (component (a)) is preferred from the viewpoint of catalytic activity or other standpoints. Such a catalyst is particularly advantageous for used as a catalyst for steam reforming hydrocarbons.

Secondly, the hydrocarbon reforming process of the present invention will next be described.

The hydrocarbon reforming process of the present invention comprises employing the above-described reforming catalyst and encompasses four embodiments: (1) a steam reforming process for hydrocarbons; (2) an autothermal reforming process for hydrocarbons; (3) a partial-oxidation reforming process for hydrocarbons; and (4) a carbon dioxide reforming process for hydrocarbons. By carrying out any of the processes, hydrogen or synthesis gas is produced.

The above-described steam reforming process (1) will next be described.

Examples of hydrocarbon feedstocks employed in the steam reforming reaction of the above process include linear-chain or branched saturated aliphatic hydrocarbons having about 1 to 16 carbon atoms such as methane, ethane, propane, butane, pentane, hexane, heptane, octane, nonane, and decane; saturated alicyclic hydrocarbons such as cyclohexane, methylcyclohexane, and cyclooctane; monocyclic and polycyclic aromatic hydrocarbons; city gas, LPG, naphtha, and kerosene.

Generally, when such a hydrocarbon feedstock contains sulfur, the material is preferably desulfurized to a sulfur content of 0.1 ppm or less through a desulfurization step. When the sulfur content of the hydrocarbon feedstock is in excess of about 0.1 ppm, a steam reforming catalyst may deactivated. No particular limitation is imposed on the desulfurization method, and any desulfurization method such as hydro-desulfurization or adsorption desulfurization can be appropriately employed. No particular limitation is imposed on the steam which is employed in steam reforming.

In determination of steam reforming reaction conditions, the amount of hydrocarbon and that of steam are controlled such that the steam/carbon (mol) ratio is generally regulated to 1.0 to 10, preferably 1.5 to 5, more preferably 2 to 4. Through control of the steam/carbon (mol) ratio, high-hydrogen-content gas can be yielded at high efficiency.

The reaction temperature is generally 200 to 900° C., preferably 250 to 900° C., more preferably 300 to 800° C. The reaction pressure is generally 0 to 3 MPa·G, preferably 0 to 1 MPa·G.

When a hydrocarbon having a boiling point equal to or higher than that of kerosene is employed as a feedstock, steam reforming is preferably performed while the inlet temperature of a steam reforming catalyst bed is maintained at 630° C. or lower, preferably 600° C. or lower. When the inlet temperature is higher than 630° C., pyrolysis of the hydrocarbon is promoted, to thereby form radicals, and carbon is deposited by the mediation of radicals on the catalyst or the reactor tube wall, leading in some cases to difficulty in operation. No particular limitation is imposed on the outlet temperature of the catalyst bed, but the outlet temperature preferably falls within a range of 650 to 800° C. When the outlet temperature is lower than 650° C., the amount of formed hydrogen may be unsatisfactory, whereas when the temperature is higher than 800° C., heat resistant material is required for manufacturing the reactor in some cases, which is disadvantageous in economy.

Reaction conditions are slightly modified depending on the produced gas; i.e., hydrogen or synthesis gas. When hydrogen is produced, a somewhat larger amount of steam is fed, and the reaction temperature and the reaction pressure are both somewhat low, whereas when synthesis gas is produced, the somewhat smaller amount of steam is fed, and the reaction temperature and the reaction pressure are both somewhat high.

In the hydrocarbon steam reforming, a catalyst containing ruthenium as the platinum group element (component (a)) is preferably employed as a reforming catalyst.

Next, the process for autothermal reforming, the process for partial-oxidation reforming, and the process for carbon dioxide reforming hydrocarbons through employment of the catalyst of the present invention will be described.

In the autothermal reforming, oxidation of a hydrocarbon and reaction of a hydrocarbon with steam occur in the same reactor or continuously situated reactors. Reaction conditions are slightly modified depending on the produced gas; i.e., hydrogen, or synthesis gas. The reaction temperature is generally 200 to 1,300° C., preferably 400 to 1,200° C., more preferably 500 to 900° C.; the steam/carbon (mol) ratio is generally 0.1 to 10, preferably 0.4 to 4; the oxygen/carbon (mol) ratio is generally 0.1 to 1, preferably 0.2 to 0.8; and the reaction pressure is generally 0 to 10 MPa·G, preferably 0 to 5 MPa·G, more preferably 0 to 3 MPa·G. Hydrocarbons similar to those employed in steam reforming are used in autothermal reforming.

In the partial-oxidation reforming, partial oxidation of a hydrocarbon occurs. Reaction conditions are slightly modified depending on the produced gas; i.e., hydrogen or synthesis gas. The reaction temperature is generally 350 to 1,200° C., preferably 450 to 900° C.; the oxygen/carbon (mol) ratio is generally 0.4 to 0.8, preferably 0.45 to 0.65; and the reaction pressure is generally 0 to 30 MPa·G, preferably 0 to 5 MPa·G, more preferably 0 to 3 MPa·G. Hydrocarbons similar to those employed in steam reforming are used in partial-oxidation reforming.

In the carbon dioxide reforming, reaction of a hydrocarbon with carbon dioxide occurs. Reaction conditions are slightly modified depending on the produced gas; i.e., hydrogen or synthesis gas. The reaction temperature is generally 200 to 1,300° C., preferably 400 to 1,200° C., more preferably 500 to 900° C.; the carbon dioxide/carbon (mol) ratio is generally 0.1 to 5, preferably 0.1 to 3; the steam/carbon (mol) ratio (when steam is fed) is generally 0.1 to 10, preferably 0.4 to 4; the oxygen/carbon (mol) ratio (when oxygen is fed) is generally 0.1 to 1, preferably 0.2 to 0.8; and the reaction pressure is generally 0 to 10 MPa·G, preferably 0 to 5 MPa·G, more preferably 0 to 3 MPa·G.

Although methane is typically used as the hydrocarbon, other hydrocarbons similar to those employed in steam reforming are also used in carbon dioxide reforming.

The aforementioned reforming reactions may be performed in a continuous flow manner or a batch manner, with a continuous flow manner being preferred. When the continuous flow manner is employed, liquid hourly space velocity (LHSV) of a hydrocarbon is generally 0.1 to 10 $hr^{-1}$, preferably 0.25 to 5 $hr^{-1}$, whereas when hydrocarbon gas such as methane is employed, gas hourly space velocity (GHSV) of the gas is generally 200 to 100,000 $hr^{-1}$.

No particular limitation is imposed on the reaction type, and any of a fixed-bed type, a moving-bed type, and a fluidizing-bed type can be employed, with a fixed-bed type being preferred. No particular limitation is imposed on the reactor type, and reactors such as a tube reactor can be employed.

Through use of the reforming catalyst of the present invention under the aforementioned conditions, a hydrocarbon is subjected to steam reforming, autothermal reforming, partial-oxidation reforming, or carbon dioxide reforming, to thereby yield a mixture containing hydrogen. Such a reforming is suitably employed as a process for producing hydrogen used in a fuel cell. In addition, synthesis gas employed in methanol synthesis, oxo synthesis, dimethyl ether synthesis, or Fischer-Tropsch synthesis can also be obtained at high efficiency.

The present invention will next be described in more detail by way of Examples and Test Examples, which should not be construed as limiting the invention thereto.

EXAMPLE 1

Cerium nitrate ($Ce(NO_3)_3 \cdot 6H_2O$, product of Wako Pure Chemical Industries, Ltd.) (126 g) was dissolved in pure water (200 mL), and an alumina carrier (NA-3, product of Nikki Universal) (200 g) was impregnated with the solution. Subsequently, the alumina carrier was dried at 80° C. for three hours by use of a rotary evaporator. The dried carrier was calcined in a muffle furnace at 750° C. for three hours, to thereby prepare an alumina carrier containing cerium oxide. The carrier was found to have an alumina content of 80 wt. % and a cerium oxide content of 20 wt. %.

Then, ruthenium trichloride ($RuCl_3 \cdot nH_2O$, product of Tanaka Kikinzoku; Ru content: 39.16 wt. %) (4.3 g) serving as an active component and cobalt nitrate ($Co(NO_3)_2 \cdot 6H_2O$, product of Wako Pure Chemical Industries, Ltd.) (9.1 g) were dissolved in pure water (30 mL), and the carrier (40 g) which had been prepared in the above-described manner was impregnated with the aqueous solution, followed by drying at 80° C. for three hours by use of a rotary evaporator.

Subsequently, the thus-prepared catalyst was immersed in a 5 mol/L sodium hydroxide solution (1 L), and the mixture was slowly stirred for one hour, to thereby decompose the compounds that had been incorporated into the catalyst during impregnation. Thereafter, the catalyst was thoroughly washed with distilled water, followed by drying at 80° C. for three hours by use of a rotary evaporator, to thereby yield catalyst 1 (Ru (4 wt. %), Co (4 wt. %), $CeO_2$ (18 wt. %), and $Al_2O_3$ (balance)). The catalyst of the composition is expressed by $4Ru/4Co/18CeO_2/Al_2O_2$ catalyst, and this rule apply hereinafter.

EXAMPLE 2

Ruthenium trichloride ($RuCl_3 \cdot nH_2O$, product of Tanaka Kikinzoku; Ru content: 39.16 wt. %) (4.3 g), cobalt nitrate ($Co(NO_3)_2 \cdot 6H_2O$, product of Wako Pure Chemical Industries, Ltd.) (9.1 g), and magnesium nitrate ($Mg(NO_3)_2 \cdot 6H_2O$, product of Wako Pure Chemical Industries, Ltd.) (10.3 g) were dissolved in pure water (25 mL), and the carrier (40 g) which had been prepared in a manner similar to that of Example 1 was impregnated with the aqueous solution, followed by drying at 80° C. for three hours by use of a rotary evaporator.

Subsequently, steps similar to those of Example 1 were repeated, to thereby yield catalyst 2 (4Ru/4Co/4Mg/17.4$CeO_2/Al_2O_3$ catalyst).

EXAMPLE 3

The procedure of Example 1 was repeated, except that the amount of ruthenium trichloride was changed to 0.51 g, to thereby yield catalyst 3 (0.5Ru/4Co/18$CeO_2/Al_2O_3$ catalyst).

EXAMPLE 4

The procedure of Example 1 was repeated, except that the amount of ruthenium trichloride was changed to 2.04 g, to thereby yield catalyst 4 (2Ru/4Co/18$CeO_2/Al_2O_3$ catalyst).

EXAMPLE 5

The procedure of Example 1 was repeated, except that the amount of ruthenium trichloride was changed to 8.2 g, to thereby yield catalyst 5 (8Ru/4Co/18$CeO_2/Al_2O_3$ catalyst).

EXAMPLE 6

The procedure of Example 2 was repeated, except that the amount of ruthenium trichloride was changed to 8.2 g, to thereby yield catalyst 6 (8Ru/4Co/4Mg/18$CeO_2/Al_2O_3$ catalyst).

EXAMPLE 7

The procedure of Example 1 was repeated, except that the amount of ruthenium trichloride was changed to 10.2 g, to thereby yield catalyst 7 (10Ru/4Co/18$CeO_2/Al_2O_3$ catalyst)

COMPARATIVE EXAMPLE 1

The procedure of Example 1 was repeated, except that no cobalt nitrate was used during incorporation of the active component into the carrier, and that the amount of pure water was changed to 36 mL, to thereby yield comparative catalyst 1 (4Ru/19$CeO_2/Al_2O_3$ catalyst).

EXAMPLE 8

The procedure of Example 1 was repeated, except that chloroplatinic acid ($H_2PtCl_6 \cdot 6H_2O$, product of Wako Pure Chemical Industries, Ltd.) (4.2 g) was employed instead of ruthenium trichloride, to thereby yield catalyst 8 (4Pt/4Co/18$CeO_2/Al_2O_3$ catalyst).

EXAMPLE 9

The procedure of Example 1 was repeated, except that palladium nitrate ($Pd(NO_3)_2$, product of Wako Pure Chemical Industries, Ltd.) (3.5 g) was employed instead of ruthenium trichloride, to thereby yield catalyst 9 (4Pd/4Co/18$CeO_2/Al_2O_3$ catalyst).

EXAMPLE 10

The procedure of Example 1 was repeated, except that rhodium chloride ($RuCl_3 \cdot 3H_2O$, product of Wako Pure Chemical Industries, Ltd.) (4.1 g) was employed instead of ruthenium trichloride, to thereby yield catalyst 10 (4Rh/4Co/18$CeO_2/Al_2O_3$ catalyst).

EXAMPLE 11

The procedure of Example 1 was repeated, except that, during incorporation of the active component into the carrier, a solution (16 mL) of chloroiridic acid in hydrochloric acid ($H_2IrCl_6$, product of Kojima Chemical Reagents, Ir content=100 g/L) was employed instead of ruthenium trichloride and the amount of pure water was changed to 20 mL, to thereby yield catalyst 11 (4Ir/4Co/18$CeO_2/Al_2O_3$ catalyst).

COMPARATIVE EXAMPLE 2

The procedure of Example 1 was repeated, except that, during incorporation of the active component into the carrier, chloroplatinic acid ($H_2PtCl_6 \cdot 6H_2O$, product of Wako Pure Chemical Industries, Ltd.) (4.2 g) was employed instead of ruthenium trichloride, no cobalt nitrate was used, and the amount of pure water was changed to 36 mL, to thereby yield comparative catalyst 2 (4Pt/18$CeO_2/Al_2O_3$ catalyst).

COMPARATIVE EXAMPLE 3

The procedure of Example 1 was repeated, except that, during incorporation of the active component into the carrier, palladium nitrate ($Pd(NO_3)_2$, product of Wako Pure Chemical Industries, Ltd.) (3.5 g) was employed instead of ruthenium trichloride, no cobalt nitrate was used, and the amount of pure water was changed to 36 mL, to thereby yield comparative catalyst 3 (4Pd/18$CeO_2/Al_2O_3$ catalyst).

COMPARATIVE EXAMPLE 4

The procedure of Example 1 was repeated, except that, during incorporation of the active component into the carrier, rhodium chloride ($RuCl_2 \cdot 3H_2O$, product of Wako Pure Chemical Industries, Ltd.) (4.1 g) was employed instead of ruthenium trichloride, no cobalt nitrate was used, and the amount of pure water was changed to 36 mL, to thereby yield comparative catalyst 4 (4Rh/18$CeO_2/Al_2O_3$ catalyst).

COMPARATIVE EXAMPLE 5

The procedure of Example 1 was repeated, except that, during incorporation of the active component into the carrier, a solution (16 mL) of chloroiridic acid in hydrochloric acid ($H_2IrCl_6$, product of Kojima Chemical Reagents, Ir content=100 g/L) was employed instead of ruthenium trichloride, no cobalt nitrate was used, and the amount of pure water was changed to 20 mL, to thereby yield comparative catalyst 5 (4Ir/18$CeO_2/Al_2O_3$ catalyst).

TEST EXAMPLE 1

Catalysts 1 to 7 and comparative catalyst 1 were evaluated in terms of steam reforming catalytic activity through the following method. The activity was determined and evaluated as percent conversion to C1 compounds (hereinafter referred to as C1 percent conversion). The results are shown in Table 1.

<Determination of C1 Percent Conversion>

Each catalyst sample was pulverized to a particle size of 0.5 to 1 mm. SiC (4.0 mL) was added to the pulverized catalyst (1.0 mL), and the mixture was charged into a quartz reactor (inner diameter: 20 mm). The catalyst contained in the mixture was reduced by hydrogen at 600° C. for one hour under hydrogen flow in the reactor. As a hydrocarbon feedstock, commercial kerosene (JIS No. 1) which had been desulfurized to a sulfur content of 0.1 ppm or less was employed. The kerosene (JIS No. 1) and steam were brought into contact with to the catalyst under the conditions: LHSV=15 hr$^{-1}$ and steam/carbon (mol ratio)=1, whereby steam reforming reaction was caused at ambient pressure and a reaction temperature of 600° C. (as measured at the central portion of the catalyst bed) (i.e., accelerated deterioration test). The resulting gas was sampled and analyzed through gas chromatography, whereby the components and concentrations thereof were determined. On the basis of the results, C1 percent conversion was obtained in accordance with the following equation:

C1 percent conversion (%)=(A/B)×100

[wherein A=CO flow rate by mol+$CO_2$ flow rate by mol+ $CH_4$ flow rate by mol (the flow rate being determined at the outlet of the reactor) and B=carbons (kerosene) flow rate by mol determined at the inlet of the reactor].

TABLE 1

| Catalyst | | C1 percent |
|---|---|---|
| No. | Structure | conversion (%) |
| Catalyst 1 | 4Ru/4Co/18CeO$_2$/Al$_2$O$_3$ | 45.2 |
| Catalyst 2 | 4Ru/4Co/4Mg/17.4CeO$_2$/Al$_2$O$_3$ | 43.0 |
| Catalyst 3 | 0.5Ru/4Co/18CeO$_2$/Al$_2$O$_3$ | 24.7 |
| Catalyst 4 | 2Ru/4Co/18CeO$_2$/Al$_2$O$_3$ | 31.3 |
| Catalyst 5 | 8Ru/4Co/18CeO$_2$/Al$_2$O$_3$ | 58.6 |
| Catalyst 6 | 8Ru/4Co/4Mg/18CeO$_2$/Al$_2$O$_3$ | 59.8 |
| Catalyst 7 | 10Ru/4Co/18CeO$_2$/Al$_2$O$_3$ | 58.3 |
| Comp. catalyst 1 | 4Ru/19CeO$_2$/Al$_2$O$_3$ | 22.9 |

TEST EXAMPLE 2

Catalysts 8 to 11 and comparative catalysts 2 to 5 were evaluated in terms of steam reforming catalytic activity through the following method. The activity was determined and evaluated as C1 percent conversion. The results are shown in Table 2.

<Determination of C1 Percent Conversion>

Each catalyst sample was pulverized to a particle size of 0.5 to 1 mm. SiC (3.5 mL) was added to the pulverized catalyst (1.5 mL), and the mixture was charged into a quartz reactor (inner diameter: 20 mm). The catalyst contained in the mixture was reduced by hydrogen at 600° C. for one hour under hydrogen flow in the reactor. As a hydrocarbon feedstock, commercial kerosene (JIS No. 1) which had been desulfurized to a sulfur content of 0.1 ppm or less was employed. The kerosene (JIS No. 1) and steam were brought into contact with to the catalyst under the conditions: LHSV=6 hr$^{-1}$ and steam/carbon (mol ratio)=3, whereby steam reforming reaction was caused at ambient pressure and a reaction temperature of 580° C. (as measured at the central portion of the catalyst layer) (i.e., accelerated deterioration test). One hour after starting of the steam reforming, the resulting gas was sampled, and C1 percent conversion was obtained in a manner as described above.

TABLE 2

| Catalyst | | C1 percent |
|---|---|---|
| No. | Structure | conversion (%) |
| Catalyst 8 | 4Pt/4Co/18CeO$_2$/Al$_2$O$_3$ | 32.2 |
| Catalyst 9 | 4Pd/4Co/18CeO$_2$/Al$_2$O$_3$ | 33.1 |
| Catalyst 10 | 4Rh/4Co/18CeO$_2$/Al$_2$O$_3$ | 48.6 |
| Catalyst 11 | 4Ir/4Co/18CeO$_2$/Al$_2$O$_3$ | 30.5 |
| Comp. catalyst 2 | 4Pt/18CeO$_2$/Al$_2$O$_3$ | 14.4 |
| Comp. catalyst 3 | 4Pd/18CeO$_2$/Al$_2$O$_3$ | 13.8 |
| Comp. catalyst 4 | 4Rh/18CeO$_2$/Al$_2$O$_3$ | 15.9 |
| Comp. catalyst 5 | 4Ir/18CeO$_2$/Al$_2$O$_3$ | 10.1 |

TEST EXAMPLE 3

Steam reforming of a variety of hydrocarbons was performed through employment of catalyst 1 or comparative catalyst 1 in the following manner.

Each catalyst sample was pulverized to a particle size of 0.5 to 1 mm. SiC (3.5 mL) was added to the pulverized catalyst (1.5 mL), and the mixture was charged into a quartz reactor (inner diameter: 20 mm). The catalyst contained in the mixture was reduced by hydrogen at 600° C. for one hour under hydrogen flow in the reactor. Hydrocarbons shown in Table 4 were employed as feedstocks. Steam reforming reaction of each hydrocarbon was caused at ambient pressure and under the conditions shown in Table 4 (i.e., accelerated deterioration test). One hour after starting of the steam reforming the resulting gas was sampled and C1 percent conversion or percent conversion of a hydrocarbon (hereinafter referred to as HC percent conversion) was obtained. The C1 percent conversion was obtained in a manner as described above, and the HC percent conversion was obtained in accordance with the following equation:

HC percent conversion (%)=[1−(the number of overall carbon atoms contained in hydrocarbon product)/(the number of overall carbon atoms contained in hydrocarbon feedstock]×100.

The results are shown in Table 4.

The composition of naphtha employed in Test Example 3 is shown in Table 3.

TABLE 3

| Composition of desulfurized naphtha (wt. %) | | | | |
|---|---|---|---|---|
| No. of C atoms in molecule | Paraffin | Naphthene | Aromatics | Total |
| 5 | 0.4 | 0.1 | — | 0.5 |
| 6 | 12.0 | 4.3 | 0.7 | 17.0 |
| 7 | 34.6 | 9.6 | 4.8 | 49.0 |
| 8 | 13.8 | 5.2 | 4.4 | 23.4 |
| 9 | 7.2 | 1.8 | 0.7 | 9.7 |
| ≧10 | 0.2 | 0.1 | 0.1 | 0.4 |
| Total | 68.2 | 21.1 | 10.7 | 100.0 |
| Sulfur content | | ≦20 ppb | | |

TABLE 4

| Catalyst No. | Feedstock | SV (hr$^{-1}$) | S/C | Temperature (° C.) | C1 percent conversion or HC percent conversion (%) |
|---|---|---|---|---|---|
| Catalyst 1 | Propane | 7,000 | 3 | 500 | C1 83.1 |
| Comp. catalyst 1 | Propane | 7,000 | 3 | 500 | C1 43.5 |
| Catalyst 1 | Naphtha | 9.5 | 1.5 | 600 | C1 45.2 |
| Comp. catalyst 1 | Naphtha | 9.5 | 1.5 | 600 | C1 25.1 |
| Catalyst 1 | Methane | 8,000 | 3 | 650 | HC 54.7 |
| Comp. catalyst 1 | Methane | 8,000 | 3 | 650 | HC 28.6 |

Note)
SV: GHSV (methane, propane), LHSV (naphtha)
S/C: Steam/carbon (mol) ratio

TEST EXAMPLE 4

Autothermal reforming of naphtha and methane was performed through employment of catalyst 1 or comparative catalyst 1 in the following manner.

Each catalyst sample was pulverized to a particle size of 0.5 to 1 mm. SiC (3.5 mL) was added to the pulverized catalyst (1.5 mL), and the mixture was charged into a quartz reactor (inner diameter: 20 mm). The catalyst contained in the mixture was reduced by hydrogen at 600° C. for one hour under hydrogen flow in the reactor. Hydrocarbons shown in Table 5 were employed as feedstocks. Autothermal reforming reaction of each hydrocarbon was caused at ambient pressure and under the conditions shown in Table 5. One hour after starting of the reforming, the resulting gas was sampled, and HC percent conversion was obtained in a manner as described above. The results are shown in Table 5. The naphtha employed in Test Example 4 had the same composition as shown in Table 3.

TABLE 5

| Catalyst No. Feedstock | Catalyst 1 Naphtha | Comp. Catalyst 1 Naphtha | Catalyst 1 Methane | Comp. Catalyst 1 Methane |
|---|---|---|---|---|
| SV (hr$^{-1}$) | 5 | 5 | 25,000 | 25,000 |
| S/C | 2.5 | 2.5 | 0.6 | 0.6 |
| O$_2$/C | 0.4 | 0.4 | 0.6 | 0.6 |
| CO$_2$/C | — | — | 0.12 | 0.12 |
| Temperature (° C.) | 800 | 800 | 1,000 | 1,000 |
| HC percent conversion (%) | 77.3 | 50.2 | 71.0 | 39.9 |

Note)
SV: GHSV (methane), LHSV (naphtha)
S/C: Steam/carbon (mol) ratio
O$_2$/C: Oxygen/carbon (mol) ratio
CO$_2$/C: Carbon dioxide/carbon (mol) ratio

TEST EXAMPLE 5

Partial-oxidation reforming of naphtha and methane was performed through employment of catalyst 1 or comparative catalyst 1 in the following manner.

Each catalyst sample was pulverized to a particle size of 0.5 to 1 mm. SiC (3.5 mL) was added to the pulverized catalyst (1.5 mL), and the mixture was charged into a quartz reactor (inner diameter: 20 mm). The catalyst contained in the mixture was reduced by hydrogen at 600° C. for one hour under hydrogen flow in the reactor. Hydrocarbons shown in Table 6 were employed as feedstocks. Partial-oxidation reformation reaction of each hydrocarbon was caused at ordinary pressure and under the conditions shown in Table 6. One hour after starting of the reforming, the resulting gas was sampled, and percent conversion of naphtha (hereinafter referred to as naphtha percent conversion) or HC percent conversion was obtained. The HC percent conversion was obtained in a manner as described above, and the naphtha percent conversion was obtained in accordance with the following equation:

Naphtha percent conversion (%)=[1−(the weight of naphtha contained in product)/(the weight of naphtha feedstock]×100.

The results are shown in Table 6.
The naphtha employed in Test Example 4 had the same composition as shown in Table 3.

TABLE 6

| Catalyst No. Feedstock | Catalyst 1 Naphtha | Comp. catalyst 1 Naphtha | Catalyst 1 Methane | Comp. catalyst 1 Methane |
|---|---|---|---|---|
| SV (hr$^{-1}$) | 15 | 15 | 5,000 | 5,000 |
| O$_2$/C | 0.5 | 0.5 | 0.5 | 0.5 |
| Temperature (° C.) | 700 | 700 | 700 | 700 |
| Percent conversion (%) | 86.2 | 72.7 | 64.9 | 48.2 |

Note)
SV: GHSV (methane), LHSV (naphtha)
O$_2$/C: Oxygen/carbon (mol) ratio
Conversion: naphtha percent conversion (naphtha), HC percent conversion (methane)

TEST EXAMPLE 6

Carbon dioxide reforming of methane was performed through employment of catalyst 1 or comparative catalyst 1 in the following manner.

Each catalyst sample was pulverized to a particle size of 0.5 to 1 mm. SiC (3.5 mL) was added to the pulverized catalyst (1.5 mL), and the mixture was charged into a quartz reactor (inner diameter: 20 mm). The catalyst contained in the mixture was reduced by hydrogen at 600° C. for one hour under hydrogen flow in the reactor. Methane was employed as a feedstock. Carbon dioxide reforming reaction of methane was caused at ordinary pressure and under the conditions shown in Table 7. One hour after starting of the reforming, the resulting gas was sampled, and CO yield was obtained. The CO yield was obtained in accordance with the following equation:

CO yield (%)=[(amount of CO (mol) contained in product)/(amounts (mol) of CO$_2$+CH$_4$ contained in feedstock]×100.

The results are shown in Table 7.

TABLE 7

| Catalyst No. | GHSV (hr$^{-1}$) | CO$_2$/C mol ratio | Temperature (° C.) | CO yield (%) |
|---|---|---|---|---|
| Catalyst 1 | 25,000 | 1 | 780 | 71.9 |
| Comp. catalyst 1 | 25,000 | 1 | 780 | 50.5 |

INDUSTRIAL APPLICABILITY

The hydrocarbon reforming catalyst of the present invention comprises an alumina carrier containing cerium oxide and, as an active component, a specific platinum group element carried by the alumina carrier. The catalyst exerts excellent catalytic activity and is suitably employed in reforming processes for hydrocarbons. Through employment of the catalyst, steam reforming, autothermal reforming, partial-oxidation reforming, or carbon dioxide reforming of hydrocarbons can be performed at high efficiency, whereby hydrogen or synthesis gas can be produced at high percent conversion.

The invention claimed is:

1. A steam reforming process for producing hydrogen or a synthesis gas from a hydrocarbon comprising
    reacting the hydrocarbon with a steam in the presence of a hydrocarbon reforming catalyst to form the hydrogen or synthesis gas,
    wherein the catalyst comprises a crystalline alumina carrier comprising cerium oxide,
    wherein a component (a) and a component (b) are carried on the carrier, and
    wherein the component (a) comprises ruthenium and the component (b) comprises cobalt.

2. The process of claim 1, wherein the process is carried out a temperature of from 200 to 900° C.

3. The process of claim 1, wherein the process is a batch process.

4. The process of claim 1, wherein the process is carried out at a pressure of from 0 to 3 MPa·G.

5. The process of claim 1, wherein the process is a continuous flow process.

6. An autothermal reforming process for producing hydrogen or a synthesis gas from a hydrocarbon comprising
    reacting the hydrocarbon with oxygen and a steam in the presence of a hydrocarbon reforming catalyst to form the hydrogen or synthesis gas,
    wherein the catalyst comprises a crystalline alumina carrier comprising cerium oxide,
    wherein a component (a) and a component (b) are carried on the carrier, and
    wherein the component (a) comprises ruthenium and the component (b) comprises cobalt.

7. The process of claim 6, wherein the process is carried out at a temperature of from 200 to 1,300° C.

8. The process of claim 6, wherein the process is carried out at a pressure of from 0 to 10 MPa·G.

9. The process of claim 6, wherein the process is a continuous flow process.

10. The process of claim 6, wherein the process is a batch process.

11. A partial-oxidation reforming process for producing hydrogen or a synthesis gas from partial oxidation of a hydrocarbon comprising
    reacting the hydrocarbon with oxygen in the presence of a hydrocarbon reforming catalyst to partially oxidize the hydrocarbon and form the hydrogen or synthesis gas,
    wherein the catalyst comprises a crystalline alumina carrier comprising cerium oxide,
    wherein a component (a) and a component (b) are carried on the carrier, and
    wherein the component (a) comprises ruthenium and the component (b) comprises cobalt.

12. The process of claim 11, wherein the process is carried out at a reaction temperature of from 350 to 1,200° C.

13. The process of claim 11, wherein the process is carried out at a pressure of from 0 to 30 MPa·G.

14. The process of claim 11, wherein the process is a continuous flow process.

15. The process of claim 11, wherein the process is a batch process.

16. A carbon dioxide reforming process for producing hydrogen or a synthesis gas from a hydrocarbon comprising
    reacting the hydrocarbon with carbon dioxide in the presence of a hydrocarbon reforming catalyst to form the hydrogen or synthesis gas,
    wherein the catalyst comprises a crystalline alumina carrier comprising cerium oxide,
    wherein a component (a) and a component (b) are carried on the carrier, and
    wherein the component (a) comprises ruthenium and the component (b) comprises cobalt.

17. The process of claim 16, wherein the process is a continuous flow process.

18. The process of claim 16, wherein the process is a batch process.

19. The process of claim 16, wherein the process is carried out at a temperature of from 200 to 1,300° C.

20. The process of claim 16, wherein the process is carried out at a pressure of from 0 to 10 MPa·G.

* * * * *